June 22, 1948.  E. A. MALLETT  2,443,771
WELDING MACHINE

Filed May 19, 1944   4 Sheets-Sheet 1

Inventor
EDWIN A. MALLETT
By Francis J. Kleinfay
Attorney

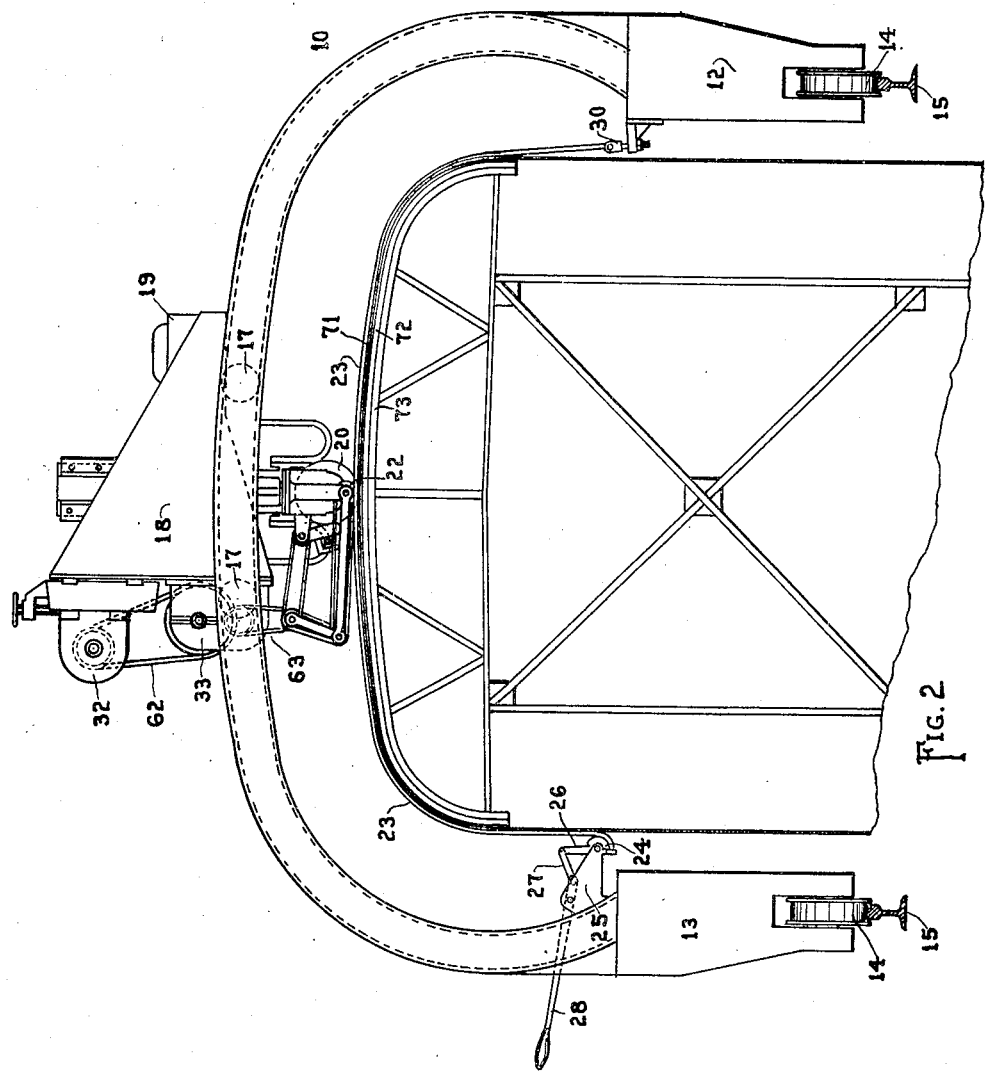

June 22, 1948.   E. A. MALLETT   2,443,771
WELDING MACHINE
Filed May 19, 1944   4 Sheets-Sheet 3

Inventor
EDWIN A. MALLETT
By Francis J. Klempay
Attorney

June 22, 1948.  E. A. MALLETT  2,443,771
WELDING MACHINE

Filed May 19, 1944  4 Sheets-Sheet 4

Inventor
EDWIN A. MALLETT
By Francis J. Klempay
Attorney

Patented June 22, 1948

2,443,771

UNITED STATES PATENT OFFICE 2,443,771

WELDING MACHINE

Edwin A. Mallett, Warren, Ohio, assignor to The Taylor-Winfield Corporation, Warren, Ohio, a corporation of Ohio Application May 19, 1944, Serial No. 536,270

10 Claims. (Cl. 219—4)

This invention relates to a welding machine of the type in which the welding electrode is caused to move relative to a curved surface of the material being welded for the purpose of effecting a continuous or an intermittent line weld and has as its principal object the provision of apparatus for effecting the relative movement in such manner that the speed of such movement is substantially constant regardless of the contour or curvature of the surface.

Heretofore, in machines for the purpose described the practice has been to move the electrode by means of a support having a constant or controllable speed relative to some fixed part, as a frame member, of the assembly but as the total and incremental distances along said fixed part or frame member bore no fixed proportional relations to the total and incremental distances along the line of contact between the electrode and the material being welded it was not possible to effect a constant speed along the line of weld. The advantages gained by enabling a constant welding speed to be automatically maintained which include, among others, a higher rate of production, a uniform seam if continuous current is applied, and evenly spaced spot welds if periodic current surges are applied, should be readily understood by those skilled in the art.

It is therefore another object of the invention to provide a machine for the purpose defined which will rapidly and automatically effect a seam weld of uniform intensity and strength in the curved members being welded.

A further object of the invention is to provide a machine having the desirable characteristics enumerated above which is simple in design, readily constructed, and which may be operated with a minimum of attention and maintenance.

As the invention may be more readily understood by describing a specific adaptation thereof I have illustrated the same as applied to a well known machine especially useful in the fabrication of railway car bodies and as the description proceeds various other objects and advantages of the invention should become apparent.

In the drawings:

Figure 2 is an end view of the apparatus of Figure 1;

Figure 1:
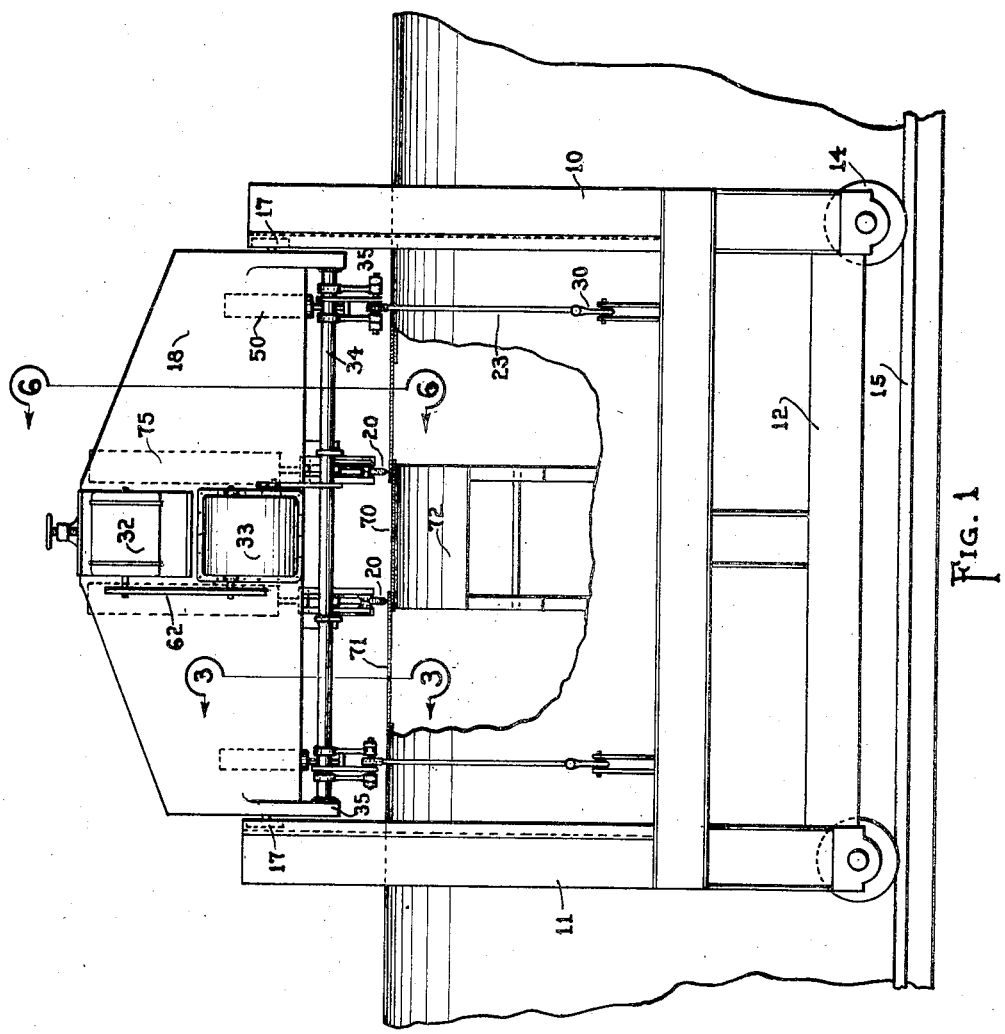
Figure 1 is a side elevational view of an apparatus embodying my invention and showing the apparatus in operating position.

As stated above, the machine illustrated is especially useful in fabricating railway car bodies and, as shown in Figures 1 and 2, it includes, in accordance with usual practice, a pair of spaced parallel inwardly opening channel members 10 and 11 curved in their vertical parallel planes to substantially the transverse contour of the car body roof. The ends of members 10 and 11 are rigidly secured and movable with the frames 12 and 13 on either side of the car body being welded. The assembly 10—13 is readily movable longitudinally along the car body on the tracks 15 which support the wheels 14 journaled on the frames 12—13. The inwardly directed channels of members 10—11 provide tracks in which the wheels 16 of the welding assembly may travel thus providing means for movably supporting the assembly and enabling the same to traverse the car body roof for the purpose of welding the roof plates or other elements of the body structure in position.

The various parts of the welding assembly are supported on frame 18 and include generally a transformer 19, welding electrodes 20 and power means to move the assembly from one side to the other side of the car roof. The latter means includes a pair of spaced driven sprockets 22 adapted to engage a pair of correspondingly spaced chains 23 which are draped over the car roof and maintained under tension by the members 24 to which one end of the chains are attached. Members 24 are pivotally mounted on arms 25 secured to frame 13 and are rotated by the pivoted levers 28 connected by links 27 with extensions 26 on the members. As will be apparent from an inspection of Figure 2 downward movement of the handle portions of the levers 28 will result in clockwise rotation of the members 24 and a tightening of the chains about the car roof structure as the other ends of the chains are secured to the opposite frame 12 by the connections 30. The tensioning mechanisms 24—28 are operable to quickly loosen the chains, enabling the welder carriage to be quickly moved to a new position relative to the structure being welded.

Suitably mounted on the frame 18 is the motor 32 which, through a variable speed reducing unit 33, drives the shaft 34 which shaft has its ends journaled in brackets 35 extending from frame 18. A pair of sprockets 36 are keyed to shaft 34 in spaced relation, being substantially aligned with the chains 23. A pair of spaced arms 37 are pivotally connected with the shaft 34 at each sprocket 36 with the sprocket between them and support at their lower ends a pin 38 on which is rotatably mounted a unitary member having one sprocket 39 meshing with chain 40 which also meshes with sprocket 36 and another sprocket 41 adapted to drive sprocket 22 through chain 42, sprocket 43 and shaft 44. Sprockets 22 and 43 are both keyed to the shaft 44 and the shafts 38 and 44 are maintained in proper spaced relation by the links 45 which are pivotally connected with the said shafts. Sprockets 22 are urged downwardly into engagement with the chains 23 by the fluid cylinders 50 carried by the frame 18. Shafts 44 are supported in yokes 51 carried by slides 52 and the connecting rods 53 transmit the forces from the cylinders to the slide 52. Fluid pressure may be supplied to cylinders 50 by any suitable means and if sufficient pressure is applied slippage of the sprockets 22 relative to chains 23 will be effectively prevented. By selecting a motor of the constant speed type for motor 32, a positive speed reducer 33 and positive drivers 62 and 63 between the motor and reducer and between the reducer and shaft 34, it is possible to drive the sprockets 22 at a constant speed of rotation and since these sprockets are in constant engagement with the chains 23, the speed of movement of the coinciding axes of the shafts 44 will be constant. Since these axes pass very close to the points of contact of the electrodes with the work it follows that the rate of progression of such contact will be substantially constant.

Figure 7:
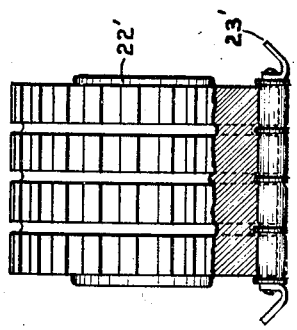
Figure 7 shows a multiple chain and sprocket which may be substituted for the single chain and sprocket of the other figures.
Figures 3, 4, 5:
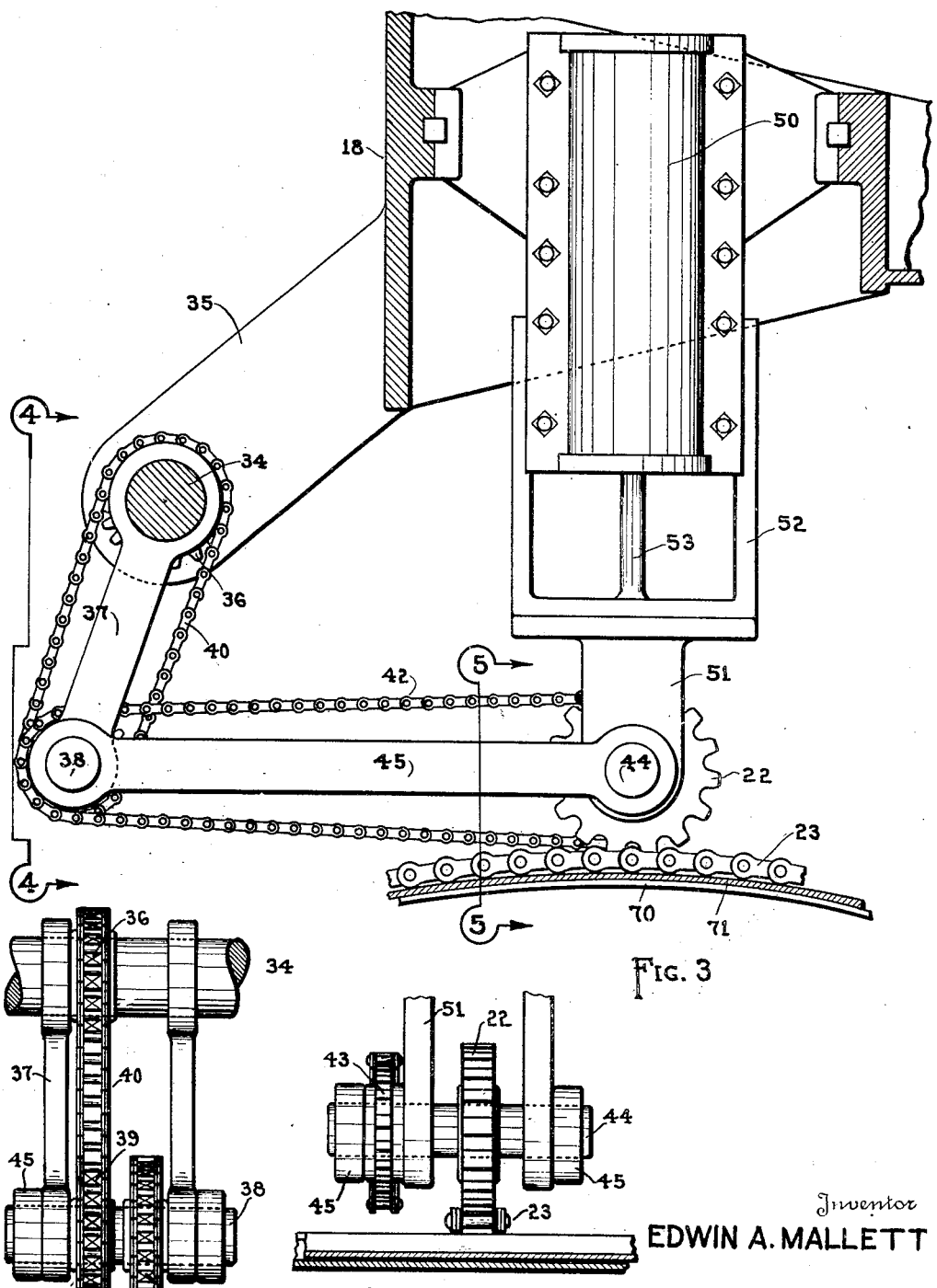
Figure 3 is a sectional view taken along the line 3—3 of Figure 1.
Figure 4 is an elevational view of a portion of apparatus shown in Figure 3.
Figure 5 is a section taken along the line 5—5 of Figure 3.
Figure 6:
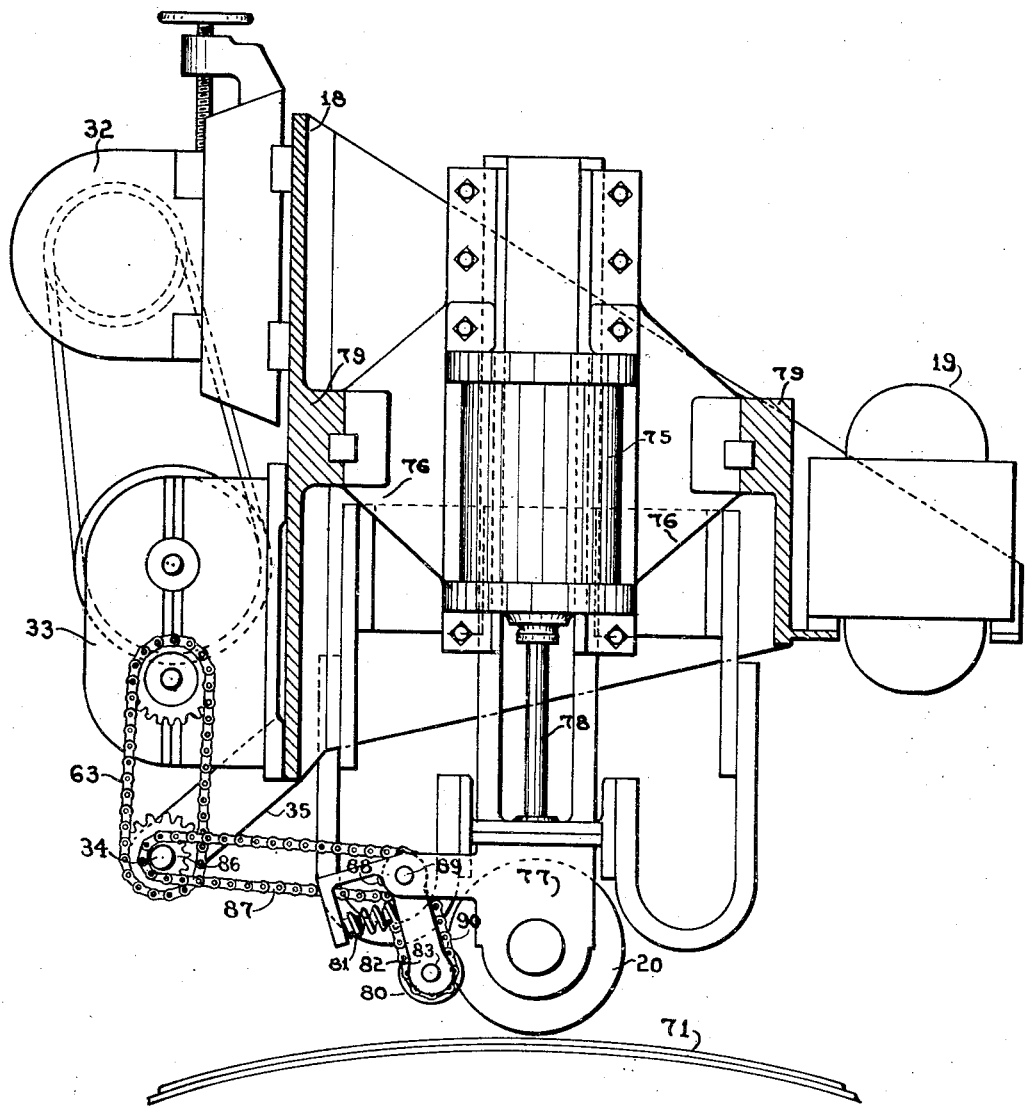
Figure 6 is a sectional view taken along the line 6—6 of Figure 1.

In Figure 7 I illustrate a multiple chain 23′ having a multiplicity of tracks for engagement by the multiple sprocket 22′ which may be substituted for the chain 23 and sprocket 22 for the purpose of increasing the capacity of the drive. The operation is precisely the same in both instances, however.

The machine illustrated is arranged to simultaneously effect a pair of welds—operating on the "series welding" principle—and accordingly two electrodes are utilized to conduct the current to the material being welded. As shown in Figure 1, the electrodes 20, in the form of wheels, are mounted in spaced parallel relation and may be utilized, for example, for welding both edges of a center plate 70 to the adjacent edges of the outer plates 71. To provide a path for the current on the inner side of the plate surfaces a shoe or jig 72 of highly conducting material is positioned directly beneath the plate 70 being welded. The current passes from a transformer secondary lead through one electrode 20, the work, the jig 72, the work, the other electrode and back to the other transformer secondary lead.

Welding pressure is applied to each of the electrodes by a fluid pressure motor 75 which exerts a downward force on the vertically movable and guided member 77 by means of the piston rod connection 78. Member 77 rotatably supports the electrode 20 in any suitable manner. Members 77 and cylinders 75 are carried by the supports 76 which in turn are slidably mounted in the tracks 79 secured to the frame 17. The purpose of this arrangement is to enable the positions of the electrodes to be moved relative to the assembly and to each other whereby seams of varying positions and spacing may be welded. Suitable conductors, not shown, may be employed to connect the transformer secondary leads with the electrodes while allowing the positions of the electrodes to be changed.

Electrodes 20 are preferably driven by the hardened peripherally grooved wheels 80 which are kept in pressure contact with the electrodes by the springs 81 which act against the pivotally supporting arms 82 carrying the wheels 80. Wheels 80 are keyed to rotatable shafts 83 to which are also keyed sprockets, not shown, driven by chains 84. Shafts 89 are journaled in members 77 and provide the pivots for the arms 82 as well as the supports for the sprockets 88 and 90 which are keyed thereto. Sprockets 90 are engaged by the chains 84 and sprockets 88 are driven by shaft 34 through sprockets 86 and chains 87. Sprockets 86 are feathered on the shaft 34 to enable the drive to be maintained irrespective of the adjusted position of the electrodes 20 and carriers 77. In operation, sufficient slack will normally be maintained in chains 87 to allow for relative movement of shafts 89 and 34 but if desired, floating intermediate shafts similar to the shafts 38 may be interposed between shafts 89 and 34.

A constant speed of rotation of the drive wheels 80 will result in a constant peripheral speed of the electrodes 20 irrespective of the diameter of the electrodes and since both the wheels 80 and the sprockets 22 are driven from the common shaft 34 it is possible by properly selecting the ratios of the various driving sprockets involved to secure such correlation between the elements that the electrodes will have a peripheral speed equal to the speed of their contact progression irrespective of the curvature of the work and variance between such curvature and the path of support of the welding assembly. Slippage between the work and the electrodes will be avoided resulting in better welds, an unmarred finished product, and longer electrode life.

It is thus made apparent that I have provided a machine for the seam welding of extensive members having curved surfaces which will accomplish the welding in a more economical and facile manner and with improved results. If a continuous current is utilized the seam weld will be uniform in density and strength and if even periodic surges of current are applied, the spots will be uniform and uniformly spaced from each other along the line of welding progression. While I have illustrated the method as applied to a machine for welding articles having convex outer surfaces it should be obvious that by the use of suitable forms or jigs to hold the chains 23 in substantially line contact with concave surfaces members having such surfaces may be successfully welded according to the teachings of my invention.

The above specifically described embodiment of my invention should be considered as illustrative only as obviously many changes may be made therein without departing from the spirit or scope of my invention, the extent of which is indicated in the subjoined claims.

What I claim is:

1. In resistance welding apparatus of the character described, a support, means on said support to secure a chain thereto and to maintain the chain in draped position over the outer surface of a member to be welded, a track on said support extending along and in generally evenly spaced relation with said surface and chain, a frame movable along said track, a sprocket carried by said frame, means on said frame to maintain said sprocket in engagement with said chain, means to rotate said sprocket to move the frame along said track, and a wheel electrode on said frame to effect a weld along said member as said frame moves along said track.

2. In resistance welding apparatus of the character described, a chain, means to secure said chain in draped position over the outer surface of a member to be welded, a track extending along and in generally evenly spaced relation with said surface and chain, a frame movable along said track, a sprocket carried by said frame, means on said frame to maintain said sprocket in engagement with said chain, means to rotate said sprocket to move the frame along said track and a resistance welding electrode on said frame to effect a weld along said member as said frame moves along said track.

3. In resistance welding apparatus of the character described, a chain, means to secure said chain in position over the outer surface of a member to be welded and in substantially co-extensive engagement therewith, a track extending along and in spaced relation with said surface and chain, a frame movable along said track, a sprocket carried by said frame, means on said frame to maintain said sprocket in engagement with said chain, means to rotate said sprocket to move the frame along said track, and a resistance welding electrode on said frame to effect a weld along said member as said frame moves along said track.

4. In resistance welding apparatus of the character described, an elongated member adapted to be secured in position over the outer surface of a member to be welded and in substantially co-extensive engagement therewith, a track extending along and in spaced relation with said surface and elongated member, a support movable along said track, means carried by said support and adapted, upon actuation, to cooperate with said elongated member to move said support along said track, means to actuate said first mentioned means, and a resistance welding electrode on said support to effect a weld along said member to be welded as said support moves along said track.

5. In apparatus of the character described, a rotatable welding electrode having a continuous surface for rolling engagement with the surface of a member to be welded, means to support said electrode, means to support the member to be welded, means providing relative translational movement between said member and said electrode whereby a seam weld may be effected in said member, said last mentioned means comprising means to provide constant relative translational speed between said electrode and the adjacent surface of said member irrespective of variation in the curvature or contour of said surface, and means to rotate said electrode to provide therein a peripheral speed equal to said speed of translation.

6. In apparatus of the character described, a rotatable welding electrode having a continuous surface for rolling engagement with the surface of a member to be welded, means to support said electrode in pressure contact with a surface of said member, means to support said member, means providing substantially constant relative translational speed between said member and said electrode whereby a weld may be effected along said member, and means to rotate said electrode to provide therein a peripheral speed equal to said speed of translation.

7. Apparatus for the electric resistance welding of a metal section having a curved electrode engaging surface comprising in combination a wheel electrode, means to conduct welding current to said electrode, a support for said electrode, means providing a path of movement for said support generally parallel with the curvature of said surface, means intermediate said support and electrode providing for movement of said electrode relative to said support and for the application of welding pressure to said electrode, means to move said support in such manner as to provide a substantially constant rate of progression of the electrode over said surface, and driving means engaging the periphery of said wheel electrode to rotate said wheel electrode at a peripheral speed substantially equal to said rate of progression.

8. Apparatus for the electric resistance welding of a metal section having a curved electrode engaging surface comprising in combination a wheel electrode, means to conduct welding current to said electrode, a support for said electrode, means providing a path of movement for said support generally parallel with the curvature of said surface, means intermediate said support and electrode providing for movement of said electrode relative to said support and for the application of welding pressure to said electrode, and means to move said support in such manner as to provide a substantially constant rate of progression of the electrode over said surface, said means to move said support comprising a flexible chain draped over said surface and maintaining a substantial co-extensive engagement therewith, a sprocket carried by said support and means to maintain said sprocket in mesh with said chain, and means to rotate said sprocket at substantially constant predetermined speeds.

9. Apparatus for the electric resistance welding of a metal section having a curved electrode engaging surface comprising in combination a wheel electrode and means to conduct welding current thereto, a support for said electrode and a track for said support extending substantially parallel with said surface, and means to move said support along said track in such manner that a substantially constant rate of progression of said electrode with respect to said surface is maintained comprising a flexible chain having its ends fixed with respect to said track and its intermediate portion draped over said surface, and a driving sprocket carried by said support in engagement with said chain.

10. Apparatus according to claim 9 further including means carried with said track to adjust the tension in said chain.

EDWIN A. MALLETT.

REFERENCES CITED

The following references are of record in the file of this patent:

UNITED STATES PATENTS

| Number | Name | Date |
|---|---|---|
| 1,282,502 | Wagner et al. | Oct. 22, 1918 |
| 2,152,596 | Lorenz et al. | Mar. 28, 1939 |
| 2,220,704 | Boles et al. | Nov. 5, 1940 |
| 2,305,163 | House | Dec. 15, 1942 |

FOREIGN PATENTS

| Number | Country | Date |
|---|---|---|
| 235,774 | Germany | June 20, 1911 |